(12) United States Patent
Yacobi et al.

(10) Patent No.: US 9,008,020 B2
(45) Date of Patent: Apr. 14, 2015

(54) METHOD AND APPARATUS FOR MANAGING RESOURCES IN A WIRELESS COMMUNICATION SYSTEM IMPLEMENTING MULTIPLE AIR INTERFACE TECHNOLOGIES

(75) Inventors: Avishai A. Yacobi, Petah Tikva (IL); Eilon Eval, Gailil Elyon (IL); Haim Friedlander, Rehovot (IL)

(73) Assignee: Motorola Solutions, Inc., Schaumburg, IL (US)

( * ) Notice: Subject to any disclaimer, the term of this patent is extended or adjusted under 35 U.S.C. 154(b) by 164 days.

(21) Appl. No.: 13/601,432

(22) Filed: Aug. 31, 2012

(65) Prior Publication Data

US 2014/0064193 A1 Mar. 6, 2014

(51) Int. Cl.
| H04W 4/00 | (2009.01) |
| H04W 72/12 | (2009.01) |
| H04W 16/14 | (2009.01) |
| H04W 76/02 | (2009.01) |
| H04W 92/02 | (2009.01) |
| H04W 92/20 | (2009.01) |
| H04W 92/24 | (2009.01) |

(52) U.S. Cl.
CPC .......... *H04W 72/1215* (2013.01); *H04W 16/14* (2013.01); *H04W 76/02* (2013.01); *H04W 92/02* (2013.01); *H04W 92/20* (2013.01); *H04W 92/24* (2013.01); *H04W 72/1226* (2013.01)

(58) Field of Classification Search
None
See application file for complete search history.

(56) References Cited

U.S. PATENT DOCUMENTS

| 8,520,544 | B2 * | 8/2013 | Aguirre et al. | 370/252 |
| 8,655,304 | B2 * | 2/2014 | Makhlouf et al. | 455/404.1 |
| 2005/0096062 | A1 * | 5/2005 | Ji et al. | 455/450 |
| 2008/0108363 | A1 * | 5/2008 | Yu et al. | 455/450 |
| 2008/0279130 | A1 | 11/2008 | Lewis | |
| 2010/0159972 | A1 * | 6/2010 | Cho et al. | 455/501 |

(Continued)

FOREIGN PATENT DOCUMENTS

| EP | 1261228 A2 | 11/2002 |
| EP | 1388951 B1 | 2/2007 |

(Continued)

OTHER PUBLICATIONS

Corresponding International Application No. PCT/US2013/055917—International Search Report Dated Jan. 8, 2014, pp. 1-13.

(Continued)

*Primary Examiner* — Donald Mills
(74) *Attorney, Agent, or Firm* — Steven May (57) ABSTRACT

A wireless communication system is provided that comprises a base station (BS) serving a subscriber unit (SU) in a Public Safety Narrowband (PSNB) network, an eNodeB serving the SU in a broadband data network, and a network element of the PSNB network that is in communication with the BS and that identifies the eNodeB to the BS. In response to the identification of the eNodeB, the BS informs the eNodeB, via an interface between a radio access network (RAN) of the PSNB network and a RAN of the broadband data network, of an initiation of a voice session in the PSNB network involving the SU and of PSNB network resources allocated to the session. In response to being informed of the initiation of the session and the allocated PSNB network resources, the eNodeB avoids allocation of resources to the SU that are spectrally proximate to the allocated PSNB network resources.

18 Claims, 6 Drawing Sheets

(56) References Cited

U.S. PATENT DOCUMENTS

| | | |
|---|---|---|
| 2011/0047230 A1* | 2/2011 | McGee .................. 709/206 |
| 2011/0136497 A1 | 6/2011 | Youtz et al. |
| 2011/0243047 A1 | 10/2011 | Dayal et al. |
| 2012/0040715 A1 | 2/2012 | Fu et al. |
| 2012/0082140 A1 | 4/2012 | Lin et al. |
| 2012/0100860 A1* | 4/2012 | Lei et al. .................. 455/438 |

FOREIGN PATENT DOCUMENTS

| | | |
|---|---|---|
| EP | 2186265 B1 | 12/2011 |
| WO | 2010147719 A1 | 12/2010 |
| WO | 2011/119750 A1 | 9/2011 |

OTHER PUBLICATIONS

Motorola Solutions: "B26 Uplink LTE UE to PS BS Co-Existence", 3GPP Draft; R4-113745 B26 UL LTE to PS Co-Existance, 3rd Generation Partnership Project (3GPP) Mobile Competence Centre, Sophia-Antipolis Cedex, France, Jun. 22, 2011, pp. 1-6.

Motorola Solutions: "Co-Existence Study Involving PSNB Systems", 3GPP Draft; R4-B26AH-0043 PSNB Co-Existance, 3rd Generation Partnership Project (3GPP) Mobile Competence Centre, Sophia-Antipolis Cedex, France, Jan. 1, 2012, pp. 1-4.

* cited by examiner

METHOD AND APPARATUS FOR MANAGING RESOURCES IN A WIRELESS COMMUNICATION SYSTEM IMPLEMENTING MULTIPLE AIR INTERFACE TECHNOLOGIES

FIELD OF THE INVENTION

The present invention relates generally to wireless communication systems, and more specifically to managing resources in a wireless communication system implementing multiple air interface technologies.

BACKGROUND OF THE INVENTION

When a broadband radio transmitter, such as a 700 MHz (Megahertz) Broadband Long Term Evolution (LTE) transmitter, is operating in the vicinity of a narrowband radio receiver, such as a Public Safety (PS) narrowband receiver, out-of-band emissions (OoBE) of the broadband transmitter may cause considerable interference to the narrowband PS receiver. The broadband transmitter's OoBE will sum with the noise of the receiver, resulting a decrease in a signal to interference-plus-noise ratio (SINR) at the narrowband PS receiver and thereby desensitize the receiver.

Figure 1:
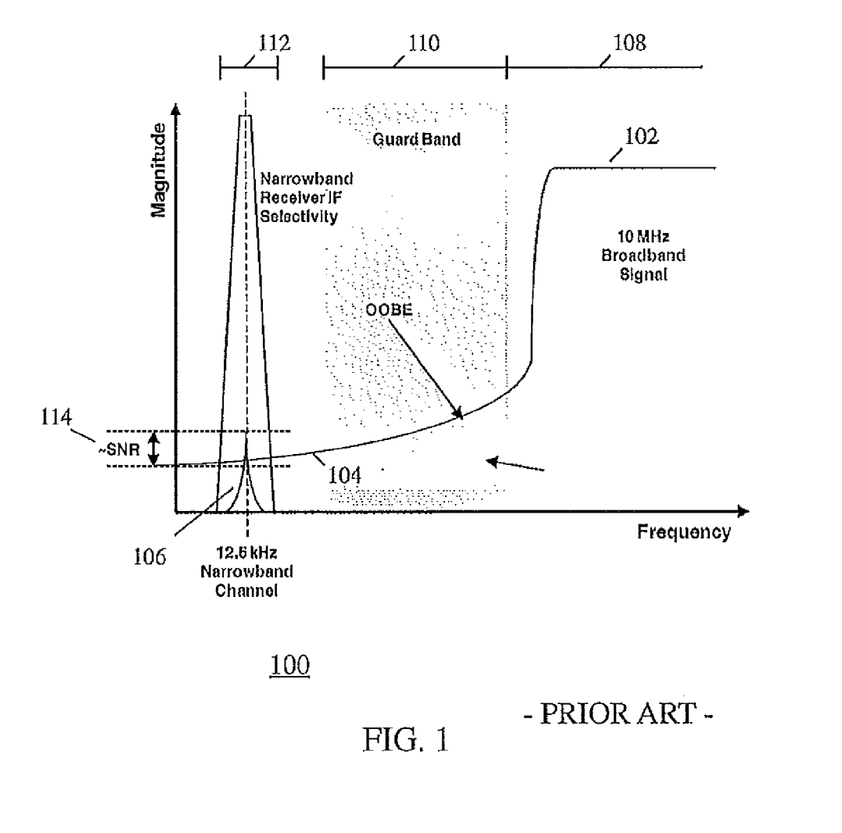
FIG. 1 is an exemplary spectral graph depicting a broadband signal whose frequency band is in close proximity to a frequency band of a narrowband signal.

For example, FIG. 1 is an exemplary spectral graph 100 depicting a broadband signal 102 whose frequency band 108 is in close proximity to the frequency band 112 of a narrowband signal 106. Despite the inclusion of a guard band 110 as a buffer between the broadband signal and adjacent signals, such as narrowband signal 106, an OoBE 104 of broadband signal 102 still spills into the bandwidth of narrowband signal 106, resulting in receiver desensitization, that is, reduced Signal-to-Noise Ratio (SNR) 114 at a narrowband receiver.

For example, such receiver desensitization is known to occur in cases such as the C band, where the close proximity of the C block uplink (transmit) band to the Public Safety Narrowband (receive) band causes desensitization of a narrowband receiver when in close proximity to a C band uplink transmitter. More specifically, in the 700-800 MHz band, the 1 MHz guard band separating the C band uplink (776-787 MHz) from the adjacent Public Safety Narrowband (PSNB) (769-775 MHz) may fail to adequately protect PSNB transmissions from interference from a nearby C band transmitter. Radio Frequency (RF) filters can only provide limited protection from interference in the PSNB by the C band uplink transmissions and cannot eliminate such interference entirely. As narrowband PS radios are used primarily for voice transmissions and are considered to be mission-critical, little degradation of performance can be tolerated.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

To address the need for managing resources so as to minimize interference in a wireless communication system implementing multiple air interface technologies, a wireless communication system is provided that comprises a base station serving a subscriber unit in a Public Safety Narrowband (PSNB) network, an eNodeB serving the subscriber unit in a broadband data network, and a network element of the PSNB network that is in communication with the base station and that identifies the eNodeB to the base station. In response to being informed of the identity of the eNodeB, the base station informs the eNodeB, via an interface between a radio access network of the PSNB network that includes the base station and a radio access network of the broadband data network that includes the eNodeB, of an initiation of a voice session in the PSNB network involving the subscriber unit and of PSNB network resources allocated to the voice session. In response to being informed of the initiation of the voice session and the allocated PSNB network resources, the eNodeB avoids allocation of resources to the subscriber unit that are spectrally proximate to the allocated PSNB network resources.

Generally, one embodiment of the present invention encompasses a method for managing resources in a multi-technology wireless communication system comprising a broadband data network and a Public Safety Narrowband (PSNB) network. The method includes identifying a base station serving a subscriber unit in the PSNB network and an eNodeB serving the subscriber unit in the broadband data network, informing the eNodeB, by the base station and via an interface between a radio access network of the PSNB network that includes the base station and a radio access network of the broadband data network that includes the eNodeB, of an initiation of a voice session in the PSNB network involving the subscriber unit and of PSNB network resources allocated to the voice session, and in response to being informed of the initiation of the voice session and the allocated PSNB network resources, avoiding allocation of resources to the subscriber unit by the broadband data network that are spectrally proximate to the PSNB network resources allocated to the voice session.

In another embodiment of the present invention, an apparatus is provided for managing resources in a multi-technology wireless communication system comprising a broadband data network and a PSNB network. The apparatus includes a base station serving a subscriber unit in the PSNB network, an eNodeB serving the subscriber unit in the broadband data network, and a network element of the PSNB network that is in communication with the base station and that identifies the eNodeB to the base station. In response to being informed of the identity of the eNodeB, the base station informs the eNodeB, via an interface between a radio access network of the PSNB network that includes the base station and a radio access network of the broadband data network that includes the eNodeB, of an initiation of a voice session in the PSNB network involving the subscriber unit and of PSNB network resources allocated to the voice session. And in response to being informed of the initiation of the voice session and the allocated PSNB network resources, the eNodeB avoids allocation of resources to the subscriber unit that are spectrally proximate to the PSNB network resources allocated to the voice session.

Figure 2:
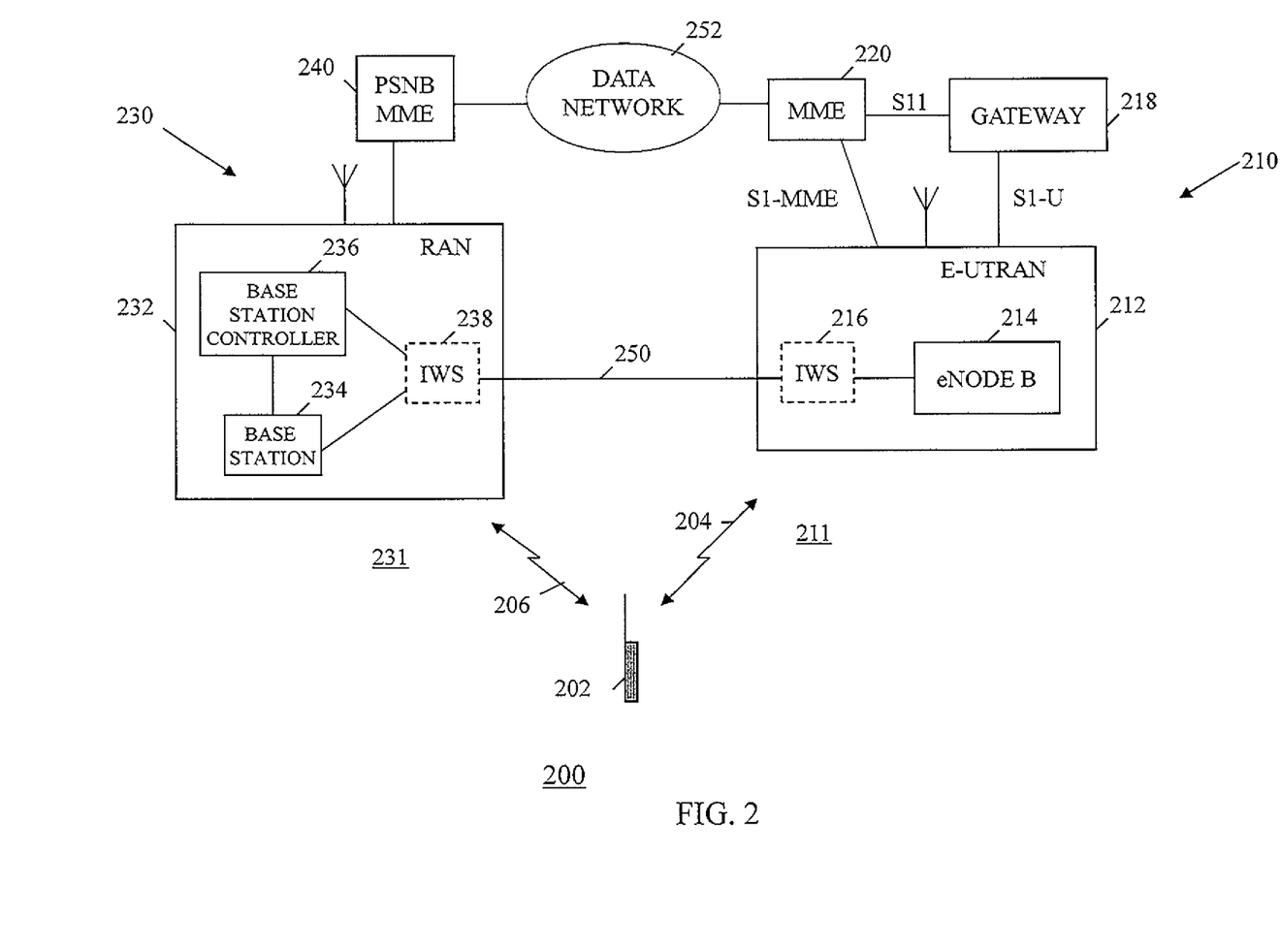
FIG. 2 is a block diagram of a wireless communication system in accordance with various embodiments of the present invention.

Turning now to the drawings, the present invention may be more fully described with reference to FIGS. 2-11B. FIG. 2 is a block diagram of a wireless communication system 200 in accordance with various embodiments of the present invention. Communication system 200 is a multi-technology wireless communication system that comprises both a broadband data network 210 and a Public Safety Narrowband (PSNB) network 230, for example, an Astro® 25 network available from Motorola Solutions, Inc., of Schaumburg, Ill., USA. Communication system 200 includes a wireless subscriber unit (SU) 202, for example but not limited to a Land Mobile Radio (LMR) or a personal computer (PC) or laptop computer equipped for wireless voice communications. SU 202 is capable of engaging in a broadband data session with broadband data network 210 and is further capable of engaging in a circuit switched voice call with PSNB network 230, and more particularly is capable of communicating with a Radio Access Network (RAN) 232 of PSNB network 230 via a PSNB protocol, such as the Project 25 (also known as APCO-25) protocol, and is capable of communicating with a RAN 212 of broadband data network 210 via a later generation protocol, for example, via a 3GPP LTE (Third Generation Partnership Project Long Term Evolution) protocol.

RAN 232 of PSNB network 230 includes a wireless base station 234, which base station may be a Base Transceiver Station (BTS) or any other type of circuit switched network wireless base station known in the art. RAN 232 further includes a base station controller 236 that is operably coupled to the base station, which may be a Base Station Controller (BSC), a Centralized Base Station Controller (CBSC), a Radio Access Network Controller (RNC), or any other type of circuit switched network wireless base station controller known in the art. PSNB network 230 further includes a PSNB Mobility Switching Management Entity (PSNB_MME) 240 that is coupled to RAN 232.

Broadband data network 210 includes a broadband data RAN 212, such as an E-UTRAN (Evolved Universal Terrestrial Radio Access Network). RAN 212 includes a packet data network base station 214, such as an eNodeB, a Node B, or a wireless Access Point (AP) or any other type of broadband data network base station known in the art (which broadband data network base stations are collectively referred to herein as an "eNodeB"). Broadband data network 110 further includes a Gateway 218 that is coupled to RAN 212, preferably via an S1-U interface, and a Mobility Management Entity (MME) 220 coupled to RAN 212, preferably via an S1-MME interface, and to Gateway 218, preferably via an S11 interface. Preferably, Gateway 218 comprises one or more of a Serving Gateway (Serving GWG) and a Public Data Network (PDN) Gateway.

Each of RAN 212 and RAN 232 provides wireless communication services to subscriber units (SUs) located in a coverage area, such as a cell or a sector of a cell, of the RAN. For example, RAN 212 provides wireless communication services to SUs located in a coverage area 211 of the RAN via air interface 204, and RAN 232 provides wireless communication services to SUs located in a coverage area 231 of the RAN via air interface 206. Each air interface 204, 206 includes a forward link that includes a pilot channel, at least one forward link traffic channel, and forward link common and dedicated signaling channels. Each air interface 204, 206 further includes a reverse link that includes at least one reverse link traffic channel, reverse link common and dedicated signaling channels, and an access channel.

Broadband RAN 212 and PSNB RAN 232, and more particularly eNodeB 214 and one of base station 234 and base station controller 236, communicate with each other via an interface 250. In order to communicate with each other, one or more of RAN 212 and RAN 232 implements a respective Interworking Solution function (IWS) 216, 238 that provides an interworking function between RAN 212, and in particular eNodeB 214, and RAN 232, and in particular one of base station 234 and base station controller 236. The IWS supports PSNB network signaling with the PSNB network 230 and supports packet data signaling with broadband data network 210 and translates between the two protocols.

As depicted in FIG. 2, IWS 216 is included in RAN 212 and is coupled to eNodeB 214, and IWS 238 is included in RAN 232 and is coupled to one or more of base station 234 and base station controller 236. While each IWS 216, 238 is depicted as an entity separate from the eNodeB, base station, and base stations controller, in various other embodiments of the present invention IWS 216 may be implemented in eNodeB 214 and IWS 238 may be implemented in one or more of base station 234 and base station controller 236. eNodeB 214, IWS 216, Gateway 218, and MME 220 each is an element of broadband data network 210 and may also be referred to herein as a network element of the broadband data network, and base station 234, base station controller 236, IWS 238, and PSNB_MME 240 each is an element of PSNB data network 230 and may also be referred to herein as a network element of the PSNB network.

Further, MME 220 and PSNB_MME 240 communicate with each other via a data network 252, for example, a private Internet Protocol (IP)-based data network or a public data network such as the Internet.

Referring now to FIGS. 3-9, block diagrams of SU 202, eNodeB 214, base station 234, base station controller 236, MME 220, PSNB_MME 240, and an IWS 700, such as IWSs 216 and 218, respectively are provided in accordance with an embodiment of the present invention. Each of SU 202, eNodeB 214, base station 234, base station controller 236, MME 220, PSNB_MME 240, and IWS 700 includes a respective processor 202, 302, 402, 502, 602, 702, 802, 902 such as one or more microprocessors, microcontrollers, digital signal processors (DSPs), customized processors, field programmable gate arrays (FPGAs), or combinations thereof or such other devices known to those having ordinary skill in the art, which processor is configured to execute the functions described herein as being executed by the SU, eNodeB, base station, base station controller, MME, PSNB_MME, and IWS.

Each of SU 202, eNodeB 214, base station 234, base station controller 236, MME 220, PSNB_MME 240, and IWS 700 further includes a respective at least one memory device 204, 304, 404, 504, 604, 704, 804, 904 such as but are not limited to a hard disk, a CD-ROM, an optical storage device, a magnetic storage device, random access memory (RAM), dynamic random access memory (DRAM), a ROM (Read Only Memory), a PROM (Programmable Read Only Memory), an EPROM (Erasable Programmable Read Only Memory), an EEPROM (Electrically Erasable Programmable Read Only Memory) a Flash memory, or equivalents thereof that is coupled to the processor and that maintains data and programs that may be executed by the associated processor and that allows the SU, eNodeB, base station, base station controller, MME, PSNB_MME, and IWS to perform all functions necessary to operate in communication system 100. When an IWS is implemented by eNodeB 214, base station 234, or base station controller 236, the IWS may implemented by a processor of the eNodeB, base station, or base station controller (that is, processors 402, 502, and 602) based on instructions maintained in an associated at least one memory device of the base station or base station controller (that is, at least one memory devices 404, 504, and 604).

The at least one memory device 304 of SU 202 further maintains one or more identifiers of the SU in association with each of networks 210 and 230, that is, a PSNB network SU identifier (PSNB_SU_ID), such as a subscriber unit identifier (SUID), in association with PSNB network 230, and a broadband data network SU identifier (BB_SU_ID), such as an International Mobile Subscriber Identifier (IMSI), in association with broadband data network 210; however, any identifiers that may be used to identify the SU in each of PSNB network 230 and broadband data network 210 may be used herein. Further, the at least one memory devices 404, 504, and 704 of eNodeB 214, base station 234, and MME 220 also each maintains an identifier of the eNodeB, base station, and MME that identifies the network element in the network element's respective system and/or a coverage, or service, area associated with the network element, for example and, a base station identifier (BS_ID), a Node B identifier (NodeB_ID), or an MME identifier (MMEI), respectively.

Figure 3:
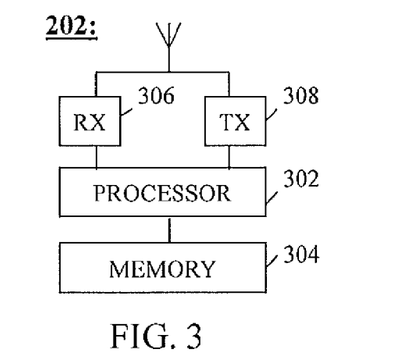
FIG. 3 is a block diagram of a subscriber unit (SU) of FIG. 2 in accordance with an embodiment of the present invention.
Figure 4:
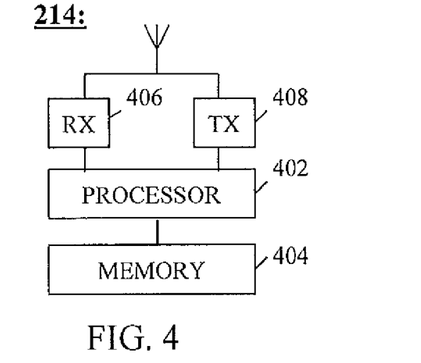
FIG. 4 is a block diagram of a broadband data network Node B of FIG. 2 in accordance with an embodiment of the present invention.
Figure 5:
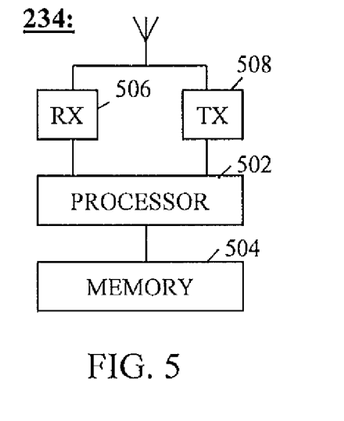
FIG. 5 is a block diagram of a Public Safety Narrowband (PSNB) network base station of FIG. 2 in accordance with an embodiment of the present invention.
Figure 6:
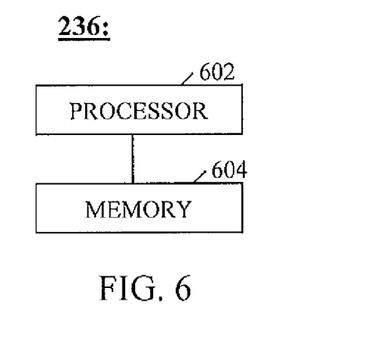
FIG. 6 is a block diagram of a Public Safety Narrowband (PSNB) network base station controller of FIG. 2 in accordance with an embodiment of the present invention.

UE 102 further includes at least one radio frequency (RF) receiver 206 and at least one RF transmitter 208 in communication with processor 202 and that wirelessly receive signals from, and transmit signals to, the infrastructure of communication system 100, and in particular both RAN 112 and RAN 132. For example, UE 102 may communicate with one or the other of Node B 114 and base station 142, or communicate with both Node B 114 and base station 142 simultaneously. Similarly, each of Node B 114 and base station 142 further includes a respective at least one RF receiver 306, 406 and a respective at least one RF transmitter 308, 408 in communication with corresponding processors 302 and 402 and that wirelessly receive signals from, and transmit signals to, UEs serviced by the Node B 114 or base station 142, such as UE 102.

For purposes of the present invention, it is assumed herein that coverage area 211 of RAN 212, and in particular of eNodeB 214, of broadband data network 210 substantially corresponds with the coverage area 231 of RAN 232, and in particular of base station 234, of PSNB network 230. That is, it is assumed herein that there is a partial or a complete overlap of coverage area 211 with coverage area 231 and SU 202 is co-located in the two coverage areas, that is, SU 202, residing in at least a portion of coverage area 211 and capable of being provided wireless services by RAN 212, and in particular by eNodeB 214, also can be provided wireless services by RAN 232 and in particular by base station 234 (herein also referred to as corresponding coverage or service areas). For example, such an overlap may include a one-to-one mapping of PSNB network 230 sectors to broadband data network 210 cells (for example, where a PSNB network 230 sector uses the same antennas as a broadband data network 210 cell), a one-to-many mapping of PSNB network 230 sectors to broadband data network 210 cells (for example, where a PSNB network 230 sector is larger than a broadband data network 210 cell and covers multiple broadband data network 210 cells), or a many-to-one mapping of PSNB network 130 sectors to broadband data network 210 cells (for example, where a broadband data network 210 cell is larger than a PSNB network 230 sector and covers multiple PSNB network 230 sectors).

Figure 7:
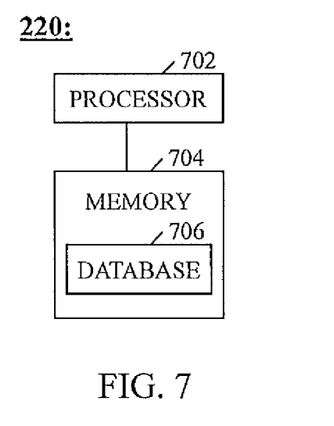
FIG. 7 is a block diagram of a Mobility Management Entity of the broadband data network of FIG. 2 in accordance with an embodiment of the present invention.

Correspondingly, the at least one memory device 704 of MME 220 maintains a database 706 comprising mappings between identifiers of eNodeBs (for example, an eNodeB_ID) serving coverage areas, such as a sector or a cell, of broadband data network 210 and identifiers of base stations (for example, a BS_ID) serving corresponding service areas, such as a sector or a cell, of PSNB network 230. While eNodeB_IDs and BS_IDs are referenced herein, the eNodeB identifiers and base station identifiers may be any identifiers that can be used to identify one or more eNodeBs or base stations serving a given coverage area, such as a cell identifier (cell_ID), a Location Area (LA) identifier, a Tracking Area (TA) identifier, a Routing Area identifier, a Registration Area (RA) identifier, and so on.

Further, for each PSNB network base station identifier included in database 706, the database maintains an identifier of an associated PSNB_MME, for example, an identifier of PSNB_MME 240 with respect to the base station 234, and a routing address, such as an IP address, of the associated PSNB_MME. Thus, by reference to database 706 and in response to receiving an identification of an eNodeB of broadband data network 210, MME 220 is able to determine an identity of a base station providing coverage to a corresponding service area of PSNB network 230 and is able to route messaging to a PSNB_MME serving the identified PSNB network base station. Further, by reference to database 706 in response to receiving an identification of a base station area of PSNB network 230, MME 220 is able to determine an identity of an eNodeB of broadband data network 210 providing coverage to a corresponding service area of the broadband data network.

Figure 8:
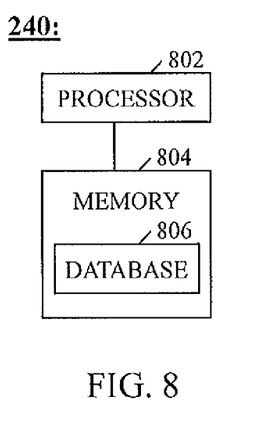
FIG. 8 is a block diagram of a Mobility Management Entity of the PSNB network of FIG. 2 in accordance with an embodiment of the present invention.
Figure 9:
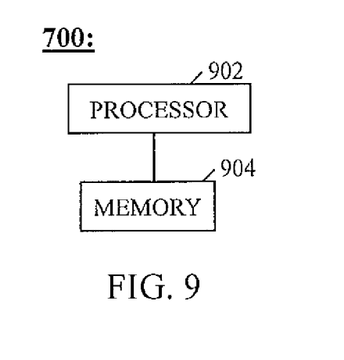
FIG. 9 is a block diagram of an Interworking Solutions function of FIG. 2 in accordance with an embodiment of the present invention.

Further, the at least one memory device 804 of PSNB_MME 240 maintains a database 806 comprising mappings, for all SUs served by PSNB network 230, such as SU 202, between a PSNB SU identifier (PSNB_SU_ID) associated with each such SU, such as an SUID, a broadband data network SU identifier (BB_SU_ID) associated with the SU, such as an IMSI, and any temporary PSNB network SU identifier assigned to the SU ('TEMP_PSNB_SU_ID'), such as a Temporary Mobile Subscriber Identity (TMSI). In various embodiments of the present invention, such SU identifiers may be pre-programmed into PSNB_MME 240 by an operator of PSNB network 230, or an SU may provide such identifiers to PSNB_MME 240 when the SU registers with the PSNB_MME, in response to which the PSNB_MME stores the received identifiers, in association with each other, in the at least one memory device 804.

Unless otherwise specified herein, the functionality described herein as being performed by SU 202, eNodeB 214, base station 234, base station controller 236, MME 220, PSNB_MME 240, and an IWS 700 is implemented with or in software programs and instructions stored in the respective at least one memory device 204, 304, 404, 504, 604, 704, 804, 904 associated with the SU, eNodeB, base station, base station controller, MME, PSNB_MME, and IWS and executed by a processor 202, 302, 402, 502, 602, 702, 802, 902 associated with the SU, eNodeB, base station, base station controller, MME, PSNB_MME, and IWS. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the SU, eNodeB, base station, base station controller, MME, PSNB_MME, and IWS. Based on the present disclosure, one skilled in the art will be readily capable of producing and implementing such software and/or hardware without undo experimentation.

In order for SU 202 to engage in a communication session in either broadband data network 2110 or PSNB network 230, each of SU 202, broadband data network 210, and PSNB network 230 operates in accordance with known wireless telecommunications protocols. PSNB network 230 is a legacy PSNB communication network, preferably but not limited to a Project 25 network, that provides circuit switched communication services to subscribers serviced by the network (it may also provide packet data services) and that operates in accordance with legacy system standards, such as the Project 25 standards. Broadband data network 130 is a later generation communication system, preferably a 3GPP LTE communication system, that provides packet data communication services to subscribers serviced by the network. To ensure compatibility, radio system parameters and call processing procedures are specified by the standards, including call processing steps that are executed by an SU and an access network serving the SU and between the access network and associated infrastructure. However, those of ordinary skill in the art realize that broadband data network 230 may operate in accordance with any one of a variety of wireless packet data communication standards that support multimedia packet data-based communication sessions, such as the 3GPP2 UMB standards, the WiMAX standards, and the IEEE (Institute of Electrical and Electronics Engineers) 802.xx standards, for example, the 802.11, 802.15, or 802.16 or 802.20 standards.

In communication system 200, in order to facilitate an engagement of SU 202 in a PSNB voice session in PSNB network 230 when the SU is located in an area that is provided wireless service by both broadband data network 210 and PSNB network 230, communication system 200 provides for notification of the broadband data network, by the PSNB network, of the PSNB voice session. Thus, broadband data network 210 may take steps to mitigate potential interference by the broadband data network with the PSNB voice session, for example, by not allocating broadband data network resources to the SU during the PSNB voice session.

Figure 10:
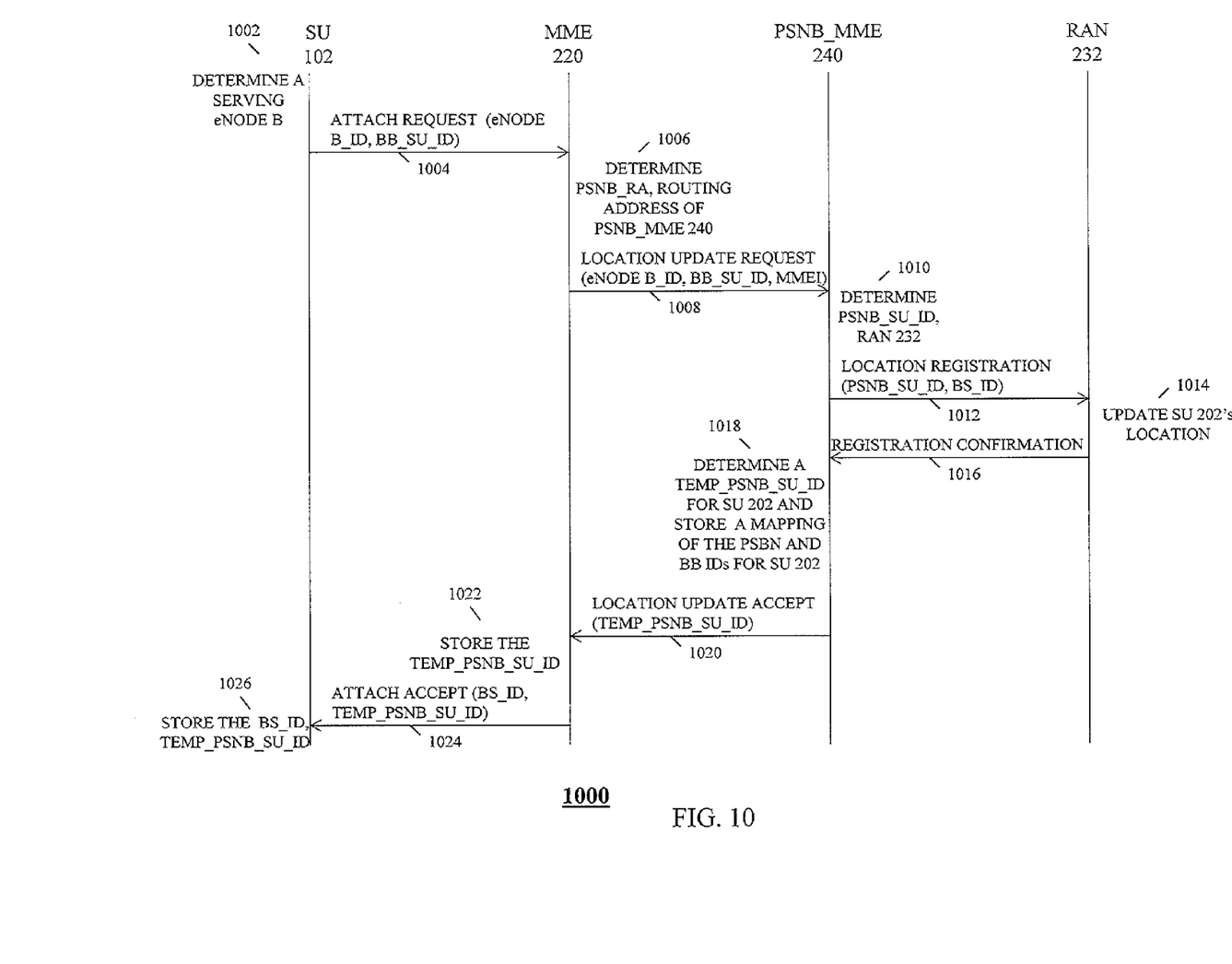
FIG. 10 is a signal flow diagram illustrating a method by which the PSNB network and the broadband data network of the communication system of FIG. 2 exchange identifiers and location information associated with an SU that co-located in a service area of each network in accordance with an embodiment of the present invention.

Referring now to FIG. 10, a signal flow diagram 1000 is provided that illustrates a method by which PSNB network 230 and broadband data network 210 of communication system 200 exchange identifiers and location information associated with an SU, that is, SU 202, that co-located in a service area of each network in accordance with an embodiment of the present invention. Signal flow diagram 1000 begins when SU 202 monitors overhead messages from broadband (BB) data network 210, and in particular from eNodeB 214 of RAN 212. Included in the overhead messages is the identifier of the eNodeB, such as an eNodeB identifier (eNodeB_ID), broadcasting the message. Based on the overhead messages, SU 202 determines (1002) and stores the identifier of NodeB 214.

In response to determining the eNodeB identifier ID of the eNodeB serving the SU in broadband data network, SU 202 attempts to attach to broadband data network 210 by conveying an attachment request 1004, preferably an ATTACH REQUEST message, to the broadband data network 210, and more particularly to MME 240 via RAN 212. Attachment request 1002 includes the determined eNodeB ('eNodeB_ID') and a broadband data network 210 SU identifier ('BB_SU_ID'), such as an IMSI associated with the SU.

Based on the service, or coverage area, of broadband data network 210 identified in attachment request 1004, and by reference to the mappings maintained in database 706, MME 240 determines 1006 a PSNB base station, that is base station 234, that provides overlapping coverage with eNodeB 214, that is, an identifier of the base station of PSNB network 230, such as a base station identifier ('BS_ID'), that overlaps in coverage with the coverage area of the eNodeB, that is, eNodeB 214, identified in the attachment request. MME 220 further determines 1006 a routing address for the PSNB_MME serving the determined PSNB network service, or coverage, area, that is, PSNB_MME 240.

In response to determining the identifier base station 234 and the PSNB_MME serving the determined PSNB network location, MME 220 assembles, and conveys to the determined PSNB_MME, that is, PSNB_MME 240, a location update message 1008, preferably a LOCATION UPDATE REQUEST message, providing an updated location of SU 202 in PSNB network 230. Location update message 1008 includes the determined PSNB network 230 base station identifier ('BS_ID') associated with SU 202, the broadband data network 210 identifier associated with the SU ('BB_SU_ID'), and an identifier of the MME sending the message, that is, MME 220 (MMEI).

In response to receiving location update message 1008 and by reference to database 806, PSNB_MME 240 determines 1010 a PSNB network 230 SU identifier (PSNB_SU_ID) for SU 202, that is, corresponding to the broadband data network 210 SU identifier (BB_SU_ID) included in the message. PSNB_MME 240 further determines, based on the PSNB network 230 base station identifier, a RAN of PSNB network 230, that is RAN 232, serving SU 202.

PSNB_MME 240 then assembles, and conveys to RAN 232, for example, to base station controller 236 or base station 234, a message 1012, preferably a LOCATION REGISTRATION message, providing a current location of SU 202 in the PSNB network. Message 1012 includes the determined PSNB_SU_ID for SU 202 and further includes the identifier of the PSNB network 230 base station associated with the location of SU 202.

In response to receiving message 1012, RAN 232, that is, base station controller 236 or base station 234, whichever is appropriate, updates a location of SU 202 (and registers the SU if the SU is not currently registered in PSNB network 230) and confirms the updating of the location of SU 202 in PSNB network 230 by conveying a confirmation message 1016 to PSNB_MME 240, preferably a REGISTRATION CONFIRMATION message.

In response to receiving confirmation message 1016, PSNB_MME 240 determines, by reference to database 806, a temporary PSNB network 230 SU identifier associated with SU 202 ('TEMP_PSNB_SU_ID'), such as a Temporary Mobile Subscriber Identity (TMSI). If no such temporary PSNB network 230 SU identifier currently exists for the SU, then PSNB_MME 240 assigns 1018 such TEMP_PSNB_SU_ID to the SU, and stores, in database 806, a mapping (if no such mapping already exists) of the assigned TEMP_PSNB_SU_ID with the PSNB network 230 SU identifier (PSNB_SU_ID) and the associated broadband data network 210 SU identifier (BB_SU_ID) for SU 202 that are maintained by the database.

PSNB_MME 240 then notifies 1018 MME 220 of the successful updating of a location, and/or registration, of SU 202 in PSNB network 230 by assembling and conveying a notification message 1020, preferably a LOCATION UPDATE ACCEPT message, to the MME. PSNB_MME 240 includes, in notification message 1020, the temporary PSNB network 230 SU identifier (TEMP_PSNB_SU_ID) assigned to SU 202.

In response to being notified of the successful updating of a location/registration of SU 202 in PSNB network 230, MME 220 stores 1022, in at least one memory device 704 of the MME, the temporary PSNB network 230 SU identifier (TEMP_PSNB_SU_ID) assigned to SU 202. Further, MME 220 accepts SU 202's attachment request by assembling and conveying, to the SU, an attachment accept message 1024, preferably a ATTACH ACCEPT message. MME 220 includes, in attachment accept message 1024, the identifier of the base station of PSNB network 230 (BS_ID) serving the area where SU 202 is currently located, and the temporary PSNB network 230 SU identifier (TEMP_PSNB_SU_ID) assigned to the SU. SU 202 stores 1026 the PSNB network 230 base station identifier (BS_ID) and the temporary PSNB network 230 SU identifier (TEMP_PSNB_SU_ID) assigned to the SU, and signal flow diagram 1000 then ends.

As a result, SU 202 knows its serving broadband data network 210 eNodeB (eNodeB_ID), the PSNB network 230 base station (BS_ID), that is, base station 234, serving the area of PSNB network 230 where the SU is currently located, and the temporary PSNB network 230 SU identifier (TEMP_PSNB_SU_ID) assigned to the SU. Further, broadband data network 210, and in particular MME 220, knows the eNodeB currently serving SU 202 in the broadband data network (eNodeB_ID), the temporary PSNB network 230 SU identifier (TEMP_PSNB_SU_ID) assigned to the SU by PSNB network 230 and the base station serving the area of PSNB network 230 where the SU is currently located (BS_ID). PSNB network 230, and in particular PSNB_MME 240, knows that SU 202 is currently in broadband data network 210, knows the broadband data network 210 SU identifier associated with the SU, and knows the identity of the MME that is serving the SU, that is, MME 220. And RAN 232 of PSNB network 230, and more particularly base station 234, knows that SU 202 resides in its coverage area.

Figure 11A:
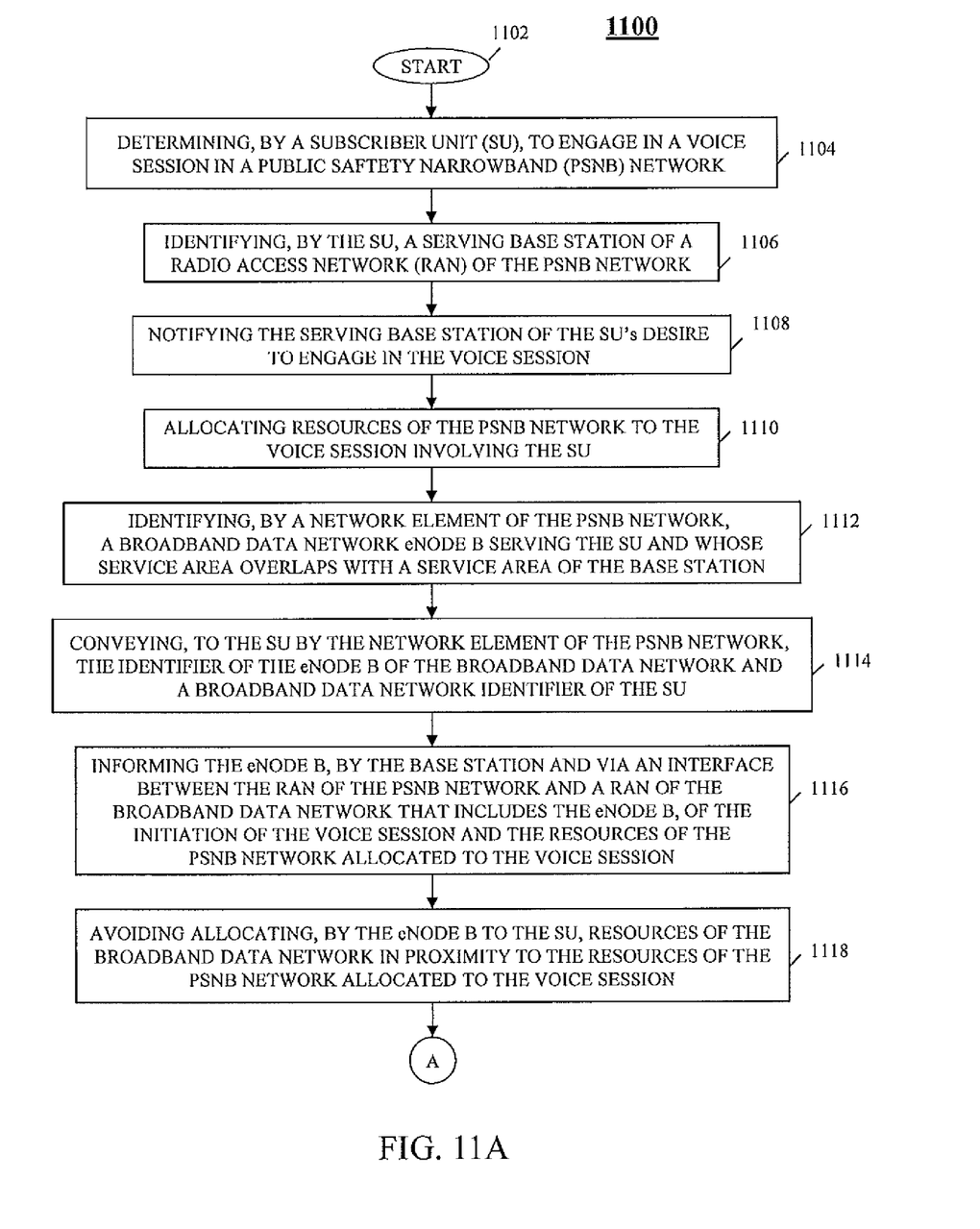
FIG. 11A is a logic flow diagram illustrating a method performed by the communication system of FIG. 2 to mitigate potential interference by a broadband data network of the communication system with a voice session of a PSNB network of the communication system involving an SU co-located in service areas of both networks in accordance an embodiment of the present invention.
Figure 11B:
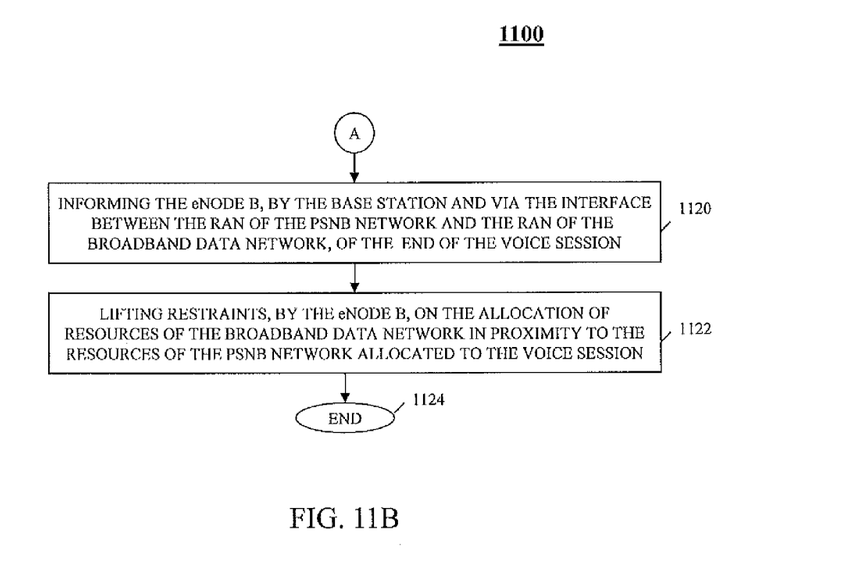
FIG. 11B is a continuation of the logic flow diagram of FIG. 11A illustrating a method performed by the communication system of FIG. 2 to mitigate potential interference by a broadband data network of the communication system with a voice session of a PSNB network of the communication system involving an SU co-located in service areas of both networks in accordance an embodiment of the present invention.

When SU 202 then determines to engage in a voice session, and in particular a high priority voice session such as a mission critical public safety voice session, in PSNB network 230, communication system 200 may take steps to mitigate potential interference by broadband data network 210 with the PSNB voice session. More particularly, referring to FIG. 11, a logic flow diagram 1100 is provided that illustrates a method performed by communication system 200 to mitigate potential interference by broadband data network 210 with a voice session in PSNB network 230 involving SU 202 when co-located in service areas of both networks 210, 230 in accordance an embodiment of the present invention.

Logic flow diagram 1100 begins (1102) when SU 202 determines (1104) to engage in a voice session in PSNB network 230. It is assumed that SU 202 is co-located in service areas of both network 210 and network 230, that is, SU both resides in coverage area 211, and is served by eNodeB 214, of broadband data network 210 and resides in coverage area 231, and is served by base station 234, of PSNB network 230. Also, it is assumed herein that SU 202 has registered with PSNB network 230 in accordance with known techniques and has identified (1106) base station 234 as the SU's serving base station in PSNB network 230.

SU 202 notifies (1108) serving base station 234 of PSNB network 230, that the SU desires to engage in the voice session, for example, by conveying an invite message, such as a call origination message or a SIP INVITE, to the base station or by responding to a page or SIP INVITE directed by base station 234 to the SU.

In response to being notified by SU 202 that the SU desires to engage in the voice session, base station 234 allocates (1110) resources, such as uplink and downlink traffic channels in air interface 206, to SU 202 and notifies a network element of the PSNB network 230, and in particular PSNB_MME 240, of the voice session. In response to being notified of the voice session, PSNB_MME 240 identifies (1112) the eNodeB, that is, eNodeB 214, of broadband data network 210 serving the SU the eNodeB of broadband data network 210 serving the SU by retrieving, from a network element of broadband data network 210, and in particular from MME 220, an identifier of the eNodeB, that is, eNodeB 214, of broadband data network 210 serving the SU and whose service area in the broadband data network overlaps with the service area of base station 234. In particular, PSNB_MME 240 inquires, of MME 220 via data network 252, of the eNodeB whose service area corresponds to, that is, overlaps with, the service area of base station 234 of PSNB network 230 and conveys, to MME 220, an identifier associated with base station 234.

Based on the identifier associated with base station 234 and by reference to database 706, MME 220 determines the identifier associated with the corresponding eNodeB, that is, eNodeB 214, and returns the identifier associated with eNodeB 214 (that is, the eNodeB's eNodeB_ID) to PSNB_MME 240. PSNB_MME 240 determines the broadband data network SU identifier (BB_SU_ID) associated with SU 202 based on the SU's PSNB network SU identifier (PSNB_SU_ID) and by reference to database 806. PSNB_MME 240 then conveys (1114), to RAN 232, and in particular base station 234, the retrieved eNodeB identifier (eNodeB_ID) and the broadband data network SU identifier (BB_SU_ID) associated with SU 202.

In response to receiving the eNodeB identifier identifying eNodeB 214 of broadband data network 210 as serving the SU in the broadband data network, base station 234 informs (1116) eNodeB 214, via interface 250 and one or more of IWSs 216 and 238, of the resources allocated to the SU by the base station for the voice session. In response to being notified of the resources allocated by base station 234 to SU 202 for the voice session, eNodeB 214 avoids (1118) allocating, to SU 202 and for the duration of the voice session, resources, that is, bandwidth, in air interface 204 that is spectrally proximity to, for example, within a predetermined frequency range of, the resources allocated by base station 234. When the SU's voice session ends, base station 234 informs (1120) eNodeB 214, via interface 250 and one or more of IWSs 216 and 238, of the end of the session and, in response, eNodeB 214 lifts (1122) restraints on the allocation of the resources within the predetermined proximity to the resources allocated by base station 234. Logic flow 1100 then ends (1124).

By not allocating broadband data network resources to SU 202 during the SU's voice session in PSNB network 230, broadband data network 210 is able mitigate potential interference with the PSNB voice session when the SU is located in an area that is provided wireless service by both the broadband data network and the PSNB network. Communication system 200 facilitates such mitigation by providing for base station 234 of PSNB network 230 to inform eNodeB 214 of broadband data network 210, via an interface between a radio access network of the PSNB network and a radio access network of the broadband data network, of an initiation of the voice session in the PSNB network involving the SU and of PSNB network resources allocated to the session. In response to being informed of the initiation of the voice session and the allocated PSNB network resources, eNodeB 214 avoids allocation of resources to SU 202 that are spectrally proximate to the allocated PSNB network resources. eNodeB 214 then may lifts such restraints when the session ends.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing resources in a multi-technology wireless communication system comprising a broadband data network and a Public Safety Narrowband (PSNB) network, the method comprising:
   identifying a base station serving a subscriber unit in the PSNB network and an eNodeB serving the subscriber unit in the broadband data network;
   informing the eNodeB, by the base station and via an interface between a radio access network of the PSNB network that includes the base station and a radio access network of the broadband data network that includes the eNodeB, of an initiation of a voice session in the PSNB network involving the subscriber unit and of PSNB network resources allocated to the voice session; and
   in response to being informed of the initiation of the voice session and the allocated PSNB network resources, avoiding allocation of resources to the subscriber unit by the broadband data network that are spectrally proximate to the PSNB network resources allocated to the voice session.

2. The method of claim 1, wherein identifying an eNodeB serving the subscriber unit in the broadband data network comprises retrieving, by a network element of the Public Safety Narrowband network from a network element of the broadband data network, an identifier of the eNodeB.

3. The method of claim 1, wherein identifying an eNodeB serving the subscriber unit in the broadband data network comprises:
   inquiring, by a network element of the Public Safety Narrowband (PSNB) network of a network element of the broadband data network, for an identifier of the eNodeB;

identifying, by the network element of the broadband data network, an identifier of the eNodeB by reference to a database maintained by the broadband data network; and conveying, by the network element of the broadband data network to the network element of the PSNB network, the identifier of the eNodeB.

4. The method of claim 3, wherein inquiring for an identifier of the eNodeB comprises conveying, to the network element of the broadband data network, an identifier associated with the base station and wherein the database comprises a mapping between identifiers associated with base stations of the Public Safety Narrowband network and identifiers associated with eNodeBs of the broadband data network.

5. The method of claim 1, further comprising conveying, by the base station to the subscriber unit, an identifier of the subscriber unit associated with the broadband data network.

6. The method of claim 5, wherein conveying, by the base station to the subscriber unit, an identifier of the subscriber unit associated with the broadband data network comprises retrieving the identifier of the subscriber unit associated with the broadband data network from a database maintained by the Public Safety Narrowband network.

7. The method of 6, wherein the database maintained by the Public Safety Narrowband (PSNB) network comprises a mapping between broadband data network subscriber unit identifiers and PSNB network subscriber unit identifiers.

8. The method of claim 1, further comprising:
determining that the voice session has ended; and
in response to determining that the voice session has ended, lifting restraints on the allocation of resources to the subscriber unit by the broadband data network that are spectrally proximate to the PSNB network resources allocated to the voice session.

9. The method of claim 8, wherein determining that the voice session has ended comprises informing the eNodeB, by the base station and via the interface between the radio access network of the PSNB network and the radio access network of the broadband data network, of the end of the voice session in the PSNB network.

10. An apparatus for managing resources in a multi-technology wireless communication system comprising a broadband data network and a Public Safety Narrowband (PSNB) network, the apparatus comprising:
a base station serving a subscriber unit in the PSNB network;
an eNodeB serving the subscriber unit in the broadband data network;
a network element of the PSNB network that is in communication with the base station and that identifies the eNodeB to the base station;
wherein in response to being informed of the identity of the eNodeB, the base station informs the eNodeB, via an interface between a radio access network of the PSNB network that includes the base station and a radio access network of the broadband data network that includes the eNodeB, of an initiation of a voice session in the PSNB network involving the subscriber unit and of PSNB network resources allocated to the voice session; and
wherein in response to being informed of the initiation of the voice session and the allocated PSNB network resources, the eNodeB avoids allocation of resources to the subscriber unit that are spectrally proximate to the PSNB network resources allocated to the voice session.

11. The apparatus of claim 10, wherein the network element of the PSNB network identifies the eNodeB by retrieving, from a network element of the broadband data network, an identifier of the eNodeB.

12. The apparatus of claim 10, wherein the apparatus further comprises a network element of the broadband data network in communication with the eNodeB, wherein the network element of the PSNB network identifies the eNodeB by inquiring, of the network element of the broadband data network, for an identifier of the eNodeB, wherein the network element of the broadband data network identifies an identifier of the eNodeB by reference to a database maintained by the broadband data network, and wherein the network element of the broadband data network conveys to the network element of the PSNB network the identifier of the eNodeB.

13. The apparatus of claim 12, wherein the network element of the PSNB network inquires for an identifier of the eNodeB by conveying, to the network element of the broadband data network, an identifier associated with the base station and wherein the database comprises a mapping between identifiers associated with base stations of the Public Safety Narrowband network and identifiers associated with eNodeBs of the broadband data network.

14. The apparatus of claim 10, wherein the base station conveys, to the subscriber unit, an identifier of the subscriber unit associated with the broadband data network.

15. The apparatus of claim 14, wherein the base station conveys, to the subscriber unit, an identifier of the subscriber unit associated with the broadband data network by retrieving the identifier of the subscriber unit associated with the broadband data network from a database maintained by the Public Safety Narrowband network.

16. The apparatus of 15, wherein the database maintained by the Public Safety Narrowband (PSNB) network comprises a mapping between broadband data network subscriber unit identifiers and PSNB network subscriber unit identifiers.

17. The apparatus of claim 10, wherein the base station determines that the voice session has ended and, in response to determining that the voice session has ended, informs the eNodeB via the interface between the radio access network of the PSNB network and the radio access network of the broadband data network, of the end of the voice session in the PSNB network.

18. The apparatus of claim 17, wherein, in response to being informed of the end of the voice session in the PSNB network, the eNodeB lifts restraints on the allocation of resources to the subscriber unit that are spectrally proximate to the PSNB network resources allocated to the voice session.

\* \* \* \* \*

UNITED STATES PATENT AND TRADEMARK OFFICE
CERTIFICATE OF CORRECTION

PATENT NO. : 9,008,020 B2
APPLICATION NO. : 13/601432
DATED : April 14, 2015
INVENTOR(S) : Avishai A. Yacobi et al.

It is certified that error appears in the above-identified patent and that said Letters Patent is hereby corrected as shown below:

IN THE TITLE PAGE:

In Item (75), under "Inventors," in Column 1, Line 2, delete "Gailil Elyon" and insert -- Galil Elyon --, therefor.

On Page 2, in Item (56), under "OTHER PUBLICATIONS," in Column 2, Line 2, delete "Co-Existance," and insert -- Co-Existence, --, therefor.

On Page 2, in Item (56), under "OTHER PUBLICATIONS," in Column 2, Line 6, delete "Co-Existance," and insert -- Co-Existence, --, therefor.

IN THE DRAWINGS:

In FIG. 10, Sheet 4 of 6, for Tag "1018", in Line 5, delete "PSBN" and insert -- PSNB --, therefor.

Signed and Sealed this
Twelfth Day of July, 2016

Michelle K. Lee
*Director of the United States Patent and Trademark Office*